United States Patent [19]

Iwaya et al.

[11] Patent Number: 5,568,116
[45] Date of Patent: Oct. 22, 1996

[54] CERAMIC COMPOSITION FOR THERMISTOR AND THERMISTOR ELEMENT

[75] Inventors: Masaki Iwaya; Kyohei Hayashi; Hiroshi Matsuzaki; Yoshirou Suematsu, all of Aichi, Japan

[73] Assignee: NGK Spark Plug Co., Ltd., Aichi, Japan

[21] Appl. No.: 248,015

[22] Filed: May 24, 1994

[30] Foreign Application Priority Data

May 24, 1993 [JP] Japan ..................... 5-144294
Dec. 22, 1993 [JP] Japan ..................... 5-346653

[51] Int. Cl.$^6$ ........................................ H01C 7/10
[52] U.S. Cl. ............................ 338/22 SD; 338/22 R
[58] Field of Search ........................ 338/22 R, 22 SD

[56] References Cited

U.S. PATENT DOCUMENTS

| | | | |
|---|---|---|---|
| 2,981,699 | 4/1961 | Ichikawa | 338/22 R |
| 3,975,307 | 10/1974 | Matsuo et al. | 252/520 |
| 4,156,661 | 5/1979 | Brodmann et al. | 252/521 |
| 4,229,322 | 10/1980 | Marchant et al. | |
| 4,743,881 | 5/1988 | Howng | 338/25 |
| 4,840,925 | 6/1989 | Rousset et al. | 501/1 |
| 4,891,158 | 1/1990 | Hata | 338/22 R |
| 4,952,902 | 8/1990 | Kawaguchi et al. | 338/22 R |

FOREIGN PATENT DOCUMENTS

| | | |
|---|---|---|
| 2315151 | 1/1977 | France. |
| 48-705 | 1/1973 | Japan. |
| 49-29493 | 3/1974 | Japan. |
| 49-63995 | 6/1974 | Japan. |
| 50-118294 | 9/1975 | Japan. |
| 61-6022 | 2/1986 | Japan. |
| 2-20121 | 5/1990 | Japan. |
| 2-44122 | 10/1990 | Japan. |
| 2-44121 | 10/1990 | Japan. |
| 51-009057 | 1/1993 | Japan. |
| 1056510 | 2/1967 | United Kingdom. |

OTHER PUBLICATIONS

Communication from European Patent Office dated Aug. 22, 1994.
Yano, K., "Fine Ceramic Handbook" published by Asakura Shoten.
Nakahara, K., "Automobile Combustion Control Sensors", vol. 30. No. 382 (1991), pp. 95–103.

*Primary Examiner*—Tu Hoang
*Assistant Examiner*—Karl Easthom
*Attorney, Agent, or Firm*—Fish & Richardson P.C.

[57] ABSTRACT

A ceramic composition for a thermistor of the formula $(M^1_{1-x}.N^1_x)(P^2_{1-y-z}.N^2_y.Al_z)O_3$ where $M^1$ is one or more elements selected from the group 3A elements of the Periodic Table excluding La, $N^1$ is one or more selected from the group 2A elements of the Periodic Table, $P^2$ is one or more selected from the elements of the groups 4A, 5A, 6A, 7A and 8 of the Periodic Table whose oxides exhibit p-type characteristics, and $N^2$ is one or more selected from the elements of the groups 4A, 5A, 6A, 7A and 8 whose oxides exhibit n-type characteristics, wherein x, y and z are larger than 0 and smaller than 1 and $0.001 \leq x/(1-y-z) < 0.20$, $0.05 \leq y/(1-y-z) \leq 0.80$ and $0 < z/(1-y-z) \leq 0.90$. Thermistor elements are usable within a broad temperature range of 300°–1100° C., have a stable resistance in oxidizing and reducing atmospheres, can prevent deterioration of lead wires, and have superior stability at high temperatures.

30 Claims, 1 Drawing Sheet

CERAMIC COMPOSITION FOR THERMISTOR AND THERMISTOR ELEMENT

FIELD OF THE INVENTION

This invention relates to a ceramic composition for a thermistor having a negative temperature coefficient and exhibiting high stability at elevated temperatures and a thermistor element prepared from the composition.

BACKGROUND

RELATED ART

As materials for thermistors which may be employed at higher temperatures, there have so far been employed (a) a material composed mainly of compounds of a corundum type crystal structure, as disclosed for example in JP Patent KOKAI Publication No. 50-118294 (JP-A-118294/75) or "Fine Ceramics Handbook" by Kenya HAMANO, published by ASAKURA SHOTEN in 1984, (b) a material composed mainly of compounds of a spinel type crystal structure, as disclosed for example in JP Patent KOKAI Publication No. 49-63995 (JP-A-63995/74), (c) a material composed mainly of $ZrO_2$, as disclosed in "Internal Combustion Engine" vol. 30, number 8, page 98, and (d) a material mainly composed of compounds of a perovskite type crystal structure.

Problems to be Solved by the Invention

However, with the material (a) composed mainly of the corundum type crystal structure, it is not possible to adjust its resistance-temperature characteristics to a greater extent, although such characteristics can be changed slightly by addition of other elements. On the other hand, the material ceases to have a stable corundum structure and is deteriorated in thermal stability on addition of an additive in a larger quantity.

The material (b) composed mainly of compounds having the spinel type crystal structure has a higher rate of change of temperature-resistance characteristics, that is a temperature gradient constant β, such that it cannot be used over a wider temperature range. On the other hand, a material composed mainly of $NiAl_2O_4$, as disclosed in JP Patent KOKAI Publication No. 49-29493 (1974) (JP-A-29493/74) or a material composed mainly of $CoAl_2O_4$, as disclosed in JP Patent KOKAI Publication No. 48-705 (JP-A-705/73), is low in thermal resistance and cannot be used at elevated temperatures.

The material (c) composed mainly of zirconia has its resistance increased for a temperature range lower than its activation temperature and cannot be practically employed.

With the material (d) composed mainly of compounds having the perovskite type crystal structure, if only a small quantity of oxides of La is left unreacted, such unreacted component is reacted with the moisture in atmosphere to yield labile $La(OH)_3$ leading to destruction of the element or to unstable resistance values.

SUMMARY OF THE DISCLOSURE

It is an object of the present invention to provide a novel ceramic devoid of the above mentioned problems.

It is a specific object of the present invention to overcome at least one of those problems and to provide a ceramic composition or a ceramic for thermistor in which at least one, preferably all of the following characteristics are satisfied: Namely, a broad range of resistance values may be obtained by adjusting the composition of the material, lead wines may be prevented from being deteriorated by being sinterable at a temperature not higher than 1600° C., and it is free from hydroscopic components and deterioration in characteristics due to environmental humidity or thermal hysteresis and hence may be used over a wide range of temperatures from room temperature up to 1100° C.

It is a further object of the present invention to provide a novel thermistor element and a thermistor device using the same.

Still further objects will become apparent in the entire disclosure and claims.

As a result of our eager investigations, the present inventors have arrived at a ceramic composition for thermistor to achieve the above object. Namely, there is provided a composition represented by the general formula $(M^1_{1-x}.N^1_x)(P^2_{1-y-z}.N^2_y.Al_z)O_3$ wherein $M^1$ denotes one or more elements selected from the elements belonging to the group 3A of the Periodic Table excluding La, $N^1$ denotes one or more elements selected from the elements belonging to the group 2A of the Periodic Table, $P^2$ denotes one or more elements selected from the elements which belong to the groups 4A, 5A, 6A, 7A and 8 and the oxides of which exhibit p-type characteristics, $N^2$ denotes one or more elements selected from the elements which belong to the groups 4A, 5A, 6A, 7A and 8 of the Periodic Table and the oxides of which exhibit n-type characteristics, and wherein x, y and z are larger than 0 and smaller than 1, and x, y and z are defined to satisfy the following formula $0.001 \leq x/(1-y-z) < 0.20$, $0.05 \leq y/(1-y-z) \leq 0.80$ and $0 < z/(1-y-z) \leq 0.90$.

A thermistor element is produced using the above-defined composition.

The groups 2A, 3A, 4A, 5A, 6A and 7A herein mean the groups 2A, 3A, 4A, 5A, 6A and 7A of the Periodic Table for elements as agreed upon by the Committee for Nomencrature for Inorganic Chemistry of the International Union of Pure and Applied Chemistry (IUPAC) of 1965.

It has now been found that a desirable ceramic composition for thermistor may be provided by a composition represented by the general formula $(M^1_{1-x}.N^1_x)(P^2_{1-y-z}.N^2_y.Al_z)O_3$ wherein $M^1$ denotes one or more elements selected from the elements Y, Sm, Pr, Nd, Dy, Er, Gd and Yb, and $N^1$ denotes one or more elements selected from the elements Mg, Ca, Sr and Ba, $P^2$ denotes one or more elements selected from the elements Cr, Mn, Co and Ni, and $N^2$ denotes one or more elements selected from the elements Fe, V and Ti, wherein x, y and z are larger than 0 and smaller than 1, and x, y and z are defined so that $$0.001 \leq x/(1-y-z) < 0.20, \quad 0.05 \leq y/(1-y-z) \leq 0.80$$

and $$0 < z/(1-y-z) > 0.90.$$

It has also been found that a desirable ceramic composition for thermistor may be provided by a composition represented by $(Y_{1-x}.Sr_x)(Cr_{1-y-z}.Fe_y.Al_z)O_3$ wherein $M^1$ is yttrium, $N^1$ is strontium, $P_2$ is chromium and $N^2$ is iron, wherein x, y and z are larger than 0 and smaller than 1, and x, y and z are defined so that $$0.001 \leq x/(1-y-z) < 0.20, \quad 0.05 \leq y/(1-y-z) \leq 0.80,$$

and $$0 < z/(1-y-z) \leq 0.90.$$

It has also been found that a desirable ceramic composition may be provided by a composition represented by $(Gd_{1-x}.Sr_x)(Cr_{1-y-z}.Fe_y.Al_z)O_3$, wherein $M^1$ is gadolinium, $N^1$ is strontium, $P_2$ is chromium, and $N^2$ is iron, and wherein x, y and z are larger than 0 and smaller than 1, and x, y and z are defined so that $$0.001 \leq x/(1-y-z) < 0.20, \quad 0.05 \leq y/(1-y-z) \leq 0.80$$

and $$0 < z/(1-y-z) \leq 0.90.$$

It has also been found that a desirable ceramic composition for thermistor may be provided by a composition represented by $(Sm_{1-x}.Sr_x)(Cr_{1-y-z}.Fe_y.Al_z)O_3$, wherein $M^1$ is samarium, $N^1$ being strontium, $P^2$ is chromium and $N^2$ is iron, with x, y and z being larger than 0 and smaller than 1, wherein x, y and z are defined so that $$0.001 \leq x/(1-y-z) < 0.20, \quad 0.05 \leq y/(1-y-z) \leq 0.80$$

and $$0 < z/(1-y-z) \leq 0.90.$$

If a sintering aid is added to the ceramic composition for thermistor for improving its sinterability, it can be sintered at lower temperatures to give high strength and superior thermal resistance. As the sintering aids, those capable of forming a liquid phase in the grain boundary to form a matrix for improving the sinterability of the ceramic may be employed. The sintering aid is preferably added in an amount of 0.5 to 10 wt % and, in particular, in an amount of 0.8 to 5 wt %, based on the weight of the ceramic composition for the thermistor.

The following functions and/or advantages are achieved by the present invention.

The material according to the present invention is of the perovskite structure and exchange may be made easily between atoms having ion radii close to each other, and thus the compositions resulting from such atom exchanges exist in a stable state. Therefore, it becomes possible to change and adjust the composition continuously over a wide range.

Also, since the composition is free from La, it is not affected by the environmental humidity and may remain stable at higher temperatures so that it may be employed over a wide temperature range form room temperature up to 1100° C. or higher. This is thought to be ascribable to the fact that the compound of the present invention remains stable at higher temperatures.

The p-type semiconductor has its resistance dependency on the oxygen partial pressure which is converse to that of the n-type semiconductor. That is, the lower the oxygen partial pressure, the higher and the lower become the resistance of the p-type semiconductor and the n-type semiconductor, respectively. The ceramic composition of the present invention is a mixture of these two semiconductor materials, the characteristics of which with respect to the oxygen partial pressure cancel each other, so that stable characteristics are exhibited despite fluctuations in the oxygen partial pressure. On the other hand, lattice defects of thermally labile oxygen or metal ions are diminished so that resistance values are not changed and remain stable even after heat hysteresis.

Since the ceramic composition is produced by simple substitution solid solution, it can be sintered at a temperature not higher than 1600° C. without producing by-products, while lead wires may be prevented from being deteriorated. In addition, sintered thermistor elements may be used over a wide temperature range of from room temperature to 1100° C. or higher. Furthermore, since the resistance values can be changed within a wide range by adjusting the composition in a wide range, it offers an advantage such that the resistance value and the thermal gradient constant (referred to as "β" hereinbelow) can be freely selected.

Process Aspects

According to the process aspects of the present invention, the following points are further mentioned which serve to illustrate the invention in more detail.

The calcination aims at to achieve a homogeneous sintered ceramic body with extensively reduced fluctuation in reaction, i.e., without segregated distribution of the phases which constitute the microstructure of the ceramic. In this regard, the starting materials are, preferably, selected from certain salts of the relevant elements, e.g., nitrates, sulfates, chlorides etc which are heat-decomposable with ease and have high reactivity upon heating for calcination.

Applying the calcination, particularly followed by pulverization, the fluctuation in the ultimate sintered products is believed to be significantly and with greater ease reduced to a minimum, as compared to the case where a mixture of the starting materials would be directly press-molded and sintered.

Thus, the calcination is carried out preferably within an approximate range of 1200° to 1450° C., more preferably about 1400° C. Also calcination is conducted until reaching a state where there is a minimum amount of nonreacted residues (in other words, reaction products of perovskite type compounds are easy for pulverizing without having been sintered with high densification). In this regard, the calcination will be continued, preferably, for at least about one hour, more preferably about 2 hours.

As for the sintering aid, there are many alternatives besides the aforementioned silica and/or mullite, such as, those compounds of types of $CaO$—$SiO_2$, $SrO$—$SiO_2$, $MgO$—$SiO_2$, $B_2O_3$—$SiO_2$—$Al_2O_3$, $B_2O_3$—$SiO_2$ and the like.

The sintering is preferably conducted at a temperature ranging 1450°–1600° C., more preferably 1450°–1550° C. The atmosphere for the sintering is generally preferred to be the ambient air or a neutral atmosphere (not oxidizing nor reducing). However, this will depend on the materials selected. For example, if $SiO_2$ is used as a sintering aid, oxidation of Cr(3+) to Cr(6+), volatilization and (even slight) reaction of $SiO_2$ with the major ingredients might serve to improve sinterability.

The sintering is carried out, preferably, for about at least on hour, more preferably, for about 1–2 hours until a sufficient density is reached, e.g., a relative density of 90% or more, or preferably 95% or more of the theoretical.

Other Features of the Products

The resulting sintered products consists essentially of perovskite type compounds, while there are phase(s) resulting from the sintering aid, usually as a grain boundary (matrix) phase which surrounds grains of perovskite.

The stable resistance is aimed at a resistance change rate as calculated as temperature being within plus/minus 15° C. after the durability test under high temperatures (e.g., at 350°, 600° C., 900° C.).

Within the generic compositional range, the following range is preferred, e.g., according to Example 1:

$0.0015 \leq x/(1-y-z) \leq 0.020$*

$0.05 \leq y/(1-y-z) \leq 0.80$ $0.20 \leq z/(1-y-z) \leq 0.90$

* corresponds to the temperature gradient constant value "β" of 3000 or more.

The following meritorious effects are achieved by the present invention.

According to the present invention there are provided thermistor elements which can be used within a broad temperature range from 300° C. to 1100° C. and possess a stable resistance against both the oxidizing and reducing atmospheres. Also there are provided ceramic compositions for thermistors and thermistor elements which are superior in the stability at a high temperature, can be used within a broad temperature range, and have a high mechanical strength, and thus they can be used as, for instance, a detecting device of overheating for the catalysts for exhaust gas purification in automobiles, measuring apparatus of high temperature gases such as detecting apparatus of the recycled exhaust gas temperature in the gas-recycling system of exhaust gas, measuring apparatus used at places of severe vibrations, or temperature measuring apparatus for various kinds of furnaces etc.

EXAMPLES

Figure 1:
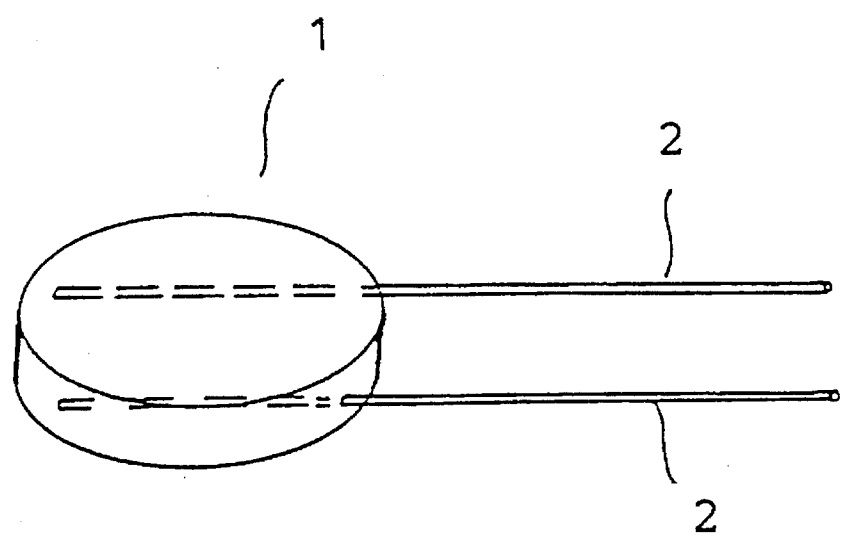
FIG. 1 shows an embodiment of the present invention.
Explanation of Symbols
1 . . . thermistor element
2 . . . lead wire

In the following preferred embodiments are disclosed with reference to specific Examples which should not be interpreted as limiting the invention thereto.

Example 1

Example 1 of the present invention is now explained.

$Y_2O_3$ having a purity of 99.9% or higher and a mean particle size of 1 μm, $SrCO_3$ having a purity of 98.5% or higher and a mean particle size of 1 μm, $FeO_3$ having a purity of 98.5% or higher and a mean particle size of 1 μm, and $Al_2O_3$ having a purity of 99.9% or higher and a mean particle size of 0.7 μm were weighed to a composition $(Y_{1-x}Sr_x)(Cr_{1-y-z}Fe_yAl_z)O_3$ where x, y and z are set as shown in Table 1, mixed by a wet mixing method, dried and calcined (pre-fired) by subsequently maintaining the mixture 1400° C. for two hours.

To the resulting calcined powders 1 wt % of $SiO_2$ powder having a mean particle size of 0.6 μm is added and mixed by a wet mixing method. The resulting mass is mixed together by a wet method to give a slurry mixture which is then passed through a 200-mesh sieve and subsequently dried. The dried mass is then admixed with a binder composed of 15 wt % of poly vinyl butyral PVB, 10 wt % of di-butyl phthalate DBP, 50 wt % of methyl ethyl ketone MEK and 25 wt % of toluene for granulating powders for press molding.

TABLE 1

| Sample No. | composition | | | resistance (kΩ) | | | β | |
|---|---|---|---|---|---|---|---|---|
| | x/1-y-z | z/1-y-z | y/1-y-z | 350° C. | 600° C. | 900° C. | 300–600 | 600–900 |
| 1 | 0.000 | 0.20 | 0.20 | 135 | 2.08 | 0.107 | 9060 | 10100 |
| 2 | 0.000 | 0.80 | 0.20 | 173 | 6.64 | 0.496 | 7400 | 8860 |
| 3 | 0.0015 | 0.20 | 0.05 | 20.0 | 0.920 | 0.120 | 6700 | 7000 |
| 4 | 0.0015 | 0.20 | 0.10 | 19.0 | 0.960 | 0.108 | 6500 | 7460 |
| 5 | 0.0015 | 0.20 | 0.20 | 22.6 | 1.000 | 0.084 | 6680 | 8490 |
| 6 | 0.0015 | 0.20 | 0.25 | 26.7 | 1.06 | 0.089 | 6770 | 8450 |
| 7 | 0.0015 | 0.20 | 0.30 | 21.5 | 0.956 | 0.094 | 6840 | 7930 |
| 8 | 0.0015 | 0.20 | 0.50 | 15.0 | 0.820 | 0.091 | 6320 | 7500 |
| 9 | 0.0015 | 0.20 | 0.80 | 8.0 | 0.550 | 0.080 | 5800 | 6500 |
| 10 | 0.0015 | 0.30 | 0.20 | 67.7 | 1.84 | 0.121 | 7600 | 9280 |
| 11 | 0.0015 | 0.30 | 0.25 | 62.6 | 1.69 | 0.120 | 7720 | 9020 |
| 12 | 0.0015 | 0.30 | 0.30 | 50.8 | 1.55 | 0.125 | 7410 | 8580 |
| 13 | 0.0015 | 0.40 | 0.20 | 141 | 2.03 | 0.130 | 8880 | 9340 |
| 14 | 0.0015 | 0.40 | 0.25 | 107 | 1.51 | 0.111 | 9040 | 8900 |
| 15 | 0.0015 | 0.40 | 0.30 | 42.3 | 0.874 | 0.091 | 8160 | 7700 |
| 16 | 0.0015 | 0.55 | 0.20 | 9.66 | 1.03 | 0.144 | 4680 | 6700 |
| 17 | 0.0015 | 0.55 | 0.25 | 31.6 | 2.20 | 0.196 | 5800 | 8220 |
| 18 | 0.0015 | 0.55 | 0.30 | 18.1 | 0.910 | 0.108 | 6500 | 7300 |
| 19 | 0.0015 | 0.80 | 0.20 | 31.1 | 2.50 | 0.327 | 5320 | 6890 |
| 20 | 0.0015 | 0.90 | 0.20 | 51.2 | 4.12 | 0.421 | 5480 | 7790 |
| 21 | 0.0020 | 0.80 | 0.20 | 6.24 | 1.26 | 0.259 | 3300 | 5400 |
| 22 | 0.0150 | 0.20 | 0.20 | 0.298 | 0.137 | 0.058 | 1870 | 3080 |

TABLE 1-continued

| Sample | composition | | | resistance (k Ω) | | | β | |
|---|---|---|---|---|---|---|---|---|
| No. | x/1-y-z | z/1-y-z | y/1-y-z | 350° C. | 600° C. | 900° C. | 300–600 | 600–900 |
| 23 | 0.0200 | 0.80 | 0.20 | 0.394 | 0.174 | 0.086 | 1830 | 2380 |
| 24 | 0.200 | 0.80 | 0.20 | 0.122 | 0.032 | 0.014 | 990 | 2800 |
| 25 | 0.250 | 0.20 | 0.20 | 0.010 | 0.006 | 0.005 | 1260 | 610 |

The resulting powders are charged into a metal mold in which two platinum wires are disposed, each 0.4 mm in diameter, at an interval of 1.2 mm, and are pressed under a pressure of 98 MPa (1000 kg/cm$^2$), for producing a molded product, 3 mm in diameter and 2 mm in thickness, having two lead lines of platinum wires, as shown in FIG. 1. The molded products are sintered in ambient air at 1550° C. to produce thermistor elements.

On the thermistor element, thus produced, resistance values in the atmosphere at 300° C., 350° C., 600° C. and 900° C. and values of the temperature gradient constant β were measured. The results are shown in the columns of the "resistance" and "β" in Table 1.

Next, the samples were maintained for 300 hours in the atmosphere at 1000° C. and the resistance values thereof at 350° C., 600° C. and 900° C. before and after the maintenance at 1000° C. were measured in order to check the durability by investigating the resistance change rate (referred to as "ΔR rate" hereinafter). The results are shown at the "ΔR rate (%)" column in Table 2. Also, environmental test was conducted by maintaining each sample at 900° C. in a chamber of a reduced oxygen pressure at an oxygen partial pressure of 0.01 Pa (10$^{-7}$ atm) followed by measuring the resistance values thereby checking the stability of the resistance values. The results are also shown at the column of "environmental test ΔR rate (%)".

TABLE 2

| Sample | ΔR rate (%) | | | environmental test |
|---|---|---|---|---|
| No. | 350° C. | 600° C. | 900° C. | ΔR rate (%) |
| 1 | −30 [10] | −18 [15] | −10 [12] | 12 [−15] |
| 2 | 22 [−13] | −11 [10] | −7 [12] | 16 [−16] |
| 3 | 17 [−9] | 9 [−10] | 6 [−12] | 4 [−8] |
| 4 | 9 [−5] | 11 [−12] | 9 [−15] | 4 [−7] |
| 5 | 6 [−4] | 8 [−8] | 5 [−8] | 2 [−3] |
| 6 | −4 [3] | −6 [6] | −6 [9] | 2 [−3] |
| 7 | −8 [5] | −9 [10] | −2 [4] | −2 [4] |
| 8 | −8 [5] | −7 [9] | −3 [5] | −3 [5] |
| 9 | −10 [7] | −7 [10] | −5 [10] | −5 [10] |
| 10 | 12 [−5] | 9 [−7] | 8 [−10] | 2 [−2] |
| 11 | 8 [−4] | 15 [−12] | 9 [−13] | −2 [3] |
| 12 | −14 [7] | −9 [7] | −6 [9] | −3 [4] |
| 13 | 10 [−3] | 7 [−5] | 9 [−12] | 3 [−4] |
| 14 | 6 [−2] | 1 [−1] | 1 [−2] | −2 [4] |
| 15 | −20 [8] | −11 [9] | −6 [10] | −1 [2] |
| 16 | 3 [−2] | 3 [−4] | 3 [−6] | −1 [2] |
| 17 | 10 [−6] | 2 [−2] | 5 [−8] | 3 [−5] |
| 18 | −10 [6] | −7 [8] | −3 [5] | 1 [−2] |
| 19 | 10 [−6] | 2 [−3] | 4 [−8] | 1 [−2] |
| 20 | 11 [−9] | 10 [−13] | 6 [−11] | −2 [4] |
| 21 | 4 [−5] | 3 [−4] | 5 [−12] | 3 [−7] |
| 22 | 5 [−8] | 2 [−9] | 5 [−15] | 0 [0] |
| 23 | 5 [−10] | 3 [−10] | 3 [−15] | 2 [−10] |
| 24 | −8 [10] | 7 [−16] | 3 [−15] | 0 [0] |
| 25 | −14 [48] | −4 [39] | −5 [110] | 0 [0] |

The temperature gradient constant β, the resistance change (ΔR) rate and the resistance change rate calculated as temperature (converted temperature value derived from the resistance change rate) are defined by the following equations:

$$\beta = \ln (R/R_o)/(1/K - 1/K_o)$$

$$\Delta R \text{ rate} = (R_t - R_o)/R_o \times 100\%$$

$$(\Delta R \text{ rate, calculated as temperature}) = \beta \times K_o/(\ln (R_t/R_o) \times K_o + \beta) - K_o$$

where ln indicates common logarithm, and R and R$_o$ indicate resistance values at absolute temperatures K and K$_o$, respectively in the atmosphere. "300–600" and "600–900" denote the temperature gradient constants β between 300° C. and 600° C. and between 600° C. and 900° C., respectively.

For the durability test, R$_t$ denotes the resistance values at a temperature t (t=300° C. or 900° C.) in the atmosphere after the durability test. For the environmental test, Rt denotes the resistance values at a temperature t (t=900° C.) in an oxygen-reduced chamber. ΔR rate calculated as temperature is shown in the square brackets [ ] at the column of "environmental test ΔR rate" in Table 2.

As apparent from Table 1, the resistance value can be adjusted easily by varying the mixing ratios of x/(1−y−z), y/(1−y−z) and z/(1−y−z) in the composition represented by the formula $(Y_{1-x}.Sr_x)(Cr_{1-y-x}.Fe_y.Al_z)O_3$.

It has turned out that the resistance and β can be increased by substituting Fe and Al for the Cr sites in the composition $(Y_{1-x}.Sr_x)(Cr_{1-y-z}.Fe_y.Al_z)O_3$. Therefore, it can easily provide thermistor elements having required resistance values and β's. This reaction system is substitution solid solution offering no yield of by-products, and thus the resistance value can be adjusted easily, which is drawn to the advantage. As shown by the durability test and the environmental test, the products exhibit very stable characteristics against the heat hysteresis and oxygen partial pressure in the ambient atmosphere.

The smaller the more preferable is the changing rates of resistance in the durability test and the environmental test. However, it is preferred to be within 15° C. (plus/minus) for the ΔR rate, calculated as temperature, which corresponds to Sample Nos. 3 to 23 in Table 2.

The reason for the above is thought as follows. On the one hand, it is ascribable to the decrease in the amount of unstable metal ion defects and oxygen ion defects against the heat hysteresis owing to mixing YCrO$_3$ as a p-type semiconductor and Fe$_2$O$_3$ as an n-type semiconductor. On the other hand, it is ascribable to the compensation or cancellation of the dependency on the oxygen partial pressure through mixing of the p-and n-type semiconductors.

Increase in the stability of resistance is observed also by substituting Sr for Y. However, the Sr substitution should be done within an extent such that it can be practically used, i.e., within the range 0.1%≦x/(1−y−z)<20% because an excess Sr substitution causes remarkable lowering in the resistance and β resulting in a deteriorated temperature dependent accuracy.

Next, the resistance change rate (ΔR rate) was investigated by keeping samples Nos. 5, 11, 14 and 17 at 1100° C.

in the ambient air for 20 hours. The results are shown in Table 3, which demonstrates that the inventive products do not suffer significant change in the resistance even after exposure to a high temperature of 1100° C. Also, a thermistor element having a high strength and a reduced deterioration of lead wires can be obtained since the sintering temperature is 1550° C.

TABLE 3

| Sample No. | Δ R rate (%) | | |
|---|---|---|---|
| | 350° C. | 600° C. | 900° C. |
| 5 | 6 [−4] | 8 [−8] | 6 [−9] |
| 11 | −9 [5] | −2 [2] | 2 [−3] |
| 14 | −2 [1] | 3 [−3] | 5 [−7] |
| 17 | 7 [−4] | 2 [−2] | 4 [−7] |

The second example will now be explained. Thermistor elements are produced according to the raw materials and method of Example 1 except that the following points. Namely $Gd_2O_3$ having a purity of 99.9% of higher and a mean particle size of 1 μm is used instead of $Y_2O_3$, and the raw materials are weighed and mixed so as to provide compositions of Sample Nos. 26 and 27 of Table 4 by setting x, y and z in the formula $(Gd_{1-x}.Sr_x)(Cr_{1-y-z}.Fe_y.Al_z)O_3$.

The temperature-resistance characteristics of the resulting thermistor elements are additionally shown at columns "resistance" and "β".

TABLE 4

| Sample No. | composition | | | resistance (k Ω) | | | β | |
|---|---|---|---|---|---|---|---|---|
| | x/1-y-z | z/1-y-z | y/1-y-z | 350° C. | 600° C. | 900° C. | 300–600 | 600–900 |
| 26 | 0.0015 | 0.40 | 0.25 | 59.2 | 1.773 | 0.126 | 6410 | 7753 |
| 27 | 0.0015 | 0.40 | 0.25 | 17.8 | 0.670 | 0.092 | 5469 | 6770 |
| 28 | 0.0015 | 0.40 | 0.25 | 2.19 | 0.300 | 0.066 | 4402 | 5168 |

The durability test and the environmental test were carried out in the same manner as in Example 1, and the results are also shown in Table 5.

TABLE 5

| Sample No. | Δ R rate (%) | | | environmental test Δ R rate (%) |
|---|---|---|---|---|
| | 350° C. | 600° C. | 900° C. | |
| 26 | 6.1 [−3] | 6.8 [−5] | 1.7 [−3] | −2.8 [5] |
| 27 | 10.6 [−6] | 8.3 [−7] | 4.0 [−8] | −1.5 [3] |
| 28 | 10.0 [−7] | 7.2 [−8] | 3.1 [−8] | −1.1 [3] |

As apparent from Table 5, the resistance amounts to an order of 10 kΩ at 350° C. and around 100Ω at 900° C., respectively, which are suitable resistance values in the practice, while β assumes 5000 to 8000.

Accordingly, these samples are qualified as thermistor elements which are suitable for use in the temperature detecting apparatus, since they exhibit little change in the resistance value even after the durability test and the environmental test.

Next, the third Example will be explained.

Thermistor elements are produced according to the raw materials and method of Example 1 except that the following points. Namely $Sm_2O_3$ having a purity of 99.9% or higher and a particle size of 1 μm is used instead of $Y_2O_3$, and the raw materials are weighed and mixed so as to provide compositions of Sample No. 28 of Table 4 by setting x, y and z in the formula.

$$(Sm_{1-x}.Sr_x)(Cr_{1-y-z}.Fe_y.Al_z)O_3$$

The temperature-resistance characteristics of the resulting thermistor elements are additionally shown at columns "resistance" and "β".

Also, the durability test and the environmental test were carried out in the same manner as Example 1 and the results are also shown in Table 5.

As apparent from Table 5, the samples are qualified as thermistor elements which are suitable for use in the temperature detecting apparatus, since they exhibit little change in the resistance value even after the durability test and the environmental test.

Samples Nos. 26 and 28 were subjected to a test at an extremely high temperature in which they were kept in the ambient air at 1100° C. for 2 hours. The resulting resistance change rates exhibited within 10% at 350° C. and within 5% at 900° C. for each sample.

It should be noted that modification which is obvious to a person skilled in the art may be done without departing from the gist and scope as disclosed and claimed herein, particularly the disclosed embodiments should not be construed narrowly such that they would serve to restrict the invention thereto.

What is claimed is:

1. A ceramic composition for thermistor, said ceramic composition having a negative temperature coefficient and being represented by the formula $(M^1_{1-x}.N^1_x)(P^2_{1-y-z}.N^2_y.Al_z)O_3$ where $M^1$ is one or more elements selected from the group consisting of the elements belonging to the group 3A of the International Periodic Table excluding La, $N^1$ is one or more elements selected from the group consisting of the elements belonging to the group 2A of the International Periodic Table, $P^2$ is one or more elements selected from the group consisting of the elements of the groups 4A, 5A, 6A, 7A and 8 of the International Periodic Table whose oxides exhibit p-type characteristics, and $N^2$ is one or more elements selected from the group consisting of the elements of groups 4A, 5A, 6A, 7A and 8 of the International Periodic Table whose oxides exhibit n-type characteristics, wherein x, y and z are larger than 0 and smaller than 1 and satisfy the following formulas $$0.001 \leq x/(1-y-z) < 0.20$$

$$0.05 \leq y/(1-y-z) \leq 0.80$$

$$0 < z/(1-y-z) \leq 0.90.$$

2. A ceramic composition for thermistor as defined in claim 1 wherein $M^1$ is one or more elements selected from the group consisting of Y, Sm, Pr, Nd, Ho, Dy, Er, Gd and Yb, $N^1$ is one or more elements selected from the group consisting of Mg, Ca, Sr and Ba, $P^2$ is one or more elements selected from the group of Cr, Mn, Co and Ni and $N^2$ is one or more elements selected from the group of Fe, V and Ti.

3. A ceramic composition for thermistor as defined in claim 1, wherein $M^1$ is Y, $N^1$ is Sr, $P^2$ is Cr and $N^2$ is Fe.

4. A ceramic composition for thermistor as defined in claim 1, wherein $M^1$ is Gd, $N^1$ is Sr, $P^2$ is Cr and $N^2$ is Fe.

5. A ceramic composition for thermistor as defined in claim 1 wherein $M^1$ is Sm, $N^1$ is Sr, $P^2$ is Cr, and $N^2$ is Fe.

6. A ceramic composition for thermistor as defined in any one of claims 1 to 5 wherein the composition further comprises a sintering aid.

7. A thermistor element produced from the composition as defined in any one of claims 1 to 5.

8. A thermistor element produced from the composition as defined in claim 6.

9. A thermistor element as defined in claim 8 wherein the sintering aid is such that provides a liquid phase at grain boundary to form a matrix.

10. A thermistor element as defined in claim 8 wherein the sintering aid is present in an amount of 0.5 to 10 wt %, preferably 0.8 to 5 wt %.

11. A thermistor element as defined in claim 8 wherein the sintering aid is silica and/or mullite.

12. A thermistor element as defined in claim 10 wherein the sintering aid is silica.

13. A thermistor element as defined in claim 8 wherein the composition is present substantially of the perovskite structure.

14. A thermistor element as defined in claim 8 which has been produced by sintering said composition at a temperature not exceeding 1600° C.

15. A thermistor element as defined in claim 14 wherein said composition has been calcined before sintering.

16. A thermistor element as defined in claim 15 wherein said composition has been calcined at a temperature not exceeding about 1400° C.

17. A thermistor element as defined in claim 8 which has a resistance change rate, calculated as temperature lying within ±15° C.

18. A thermistor element as defined in claim 8 which has a temperature gradient constant β of 5000 to 8000.

19. A thermistor element as defined in claim 7 which has a temperature gradient constant β of at least 3000.

20. A thermistor element as defined in claim 19 wherein $0.0015 \leq x/(1-y-z) \leq 0.020$, and $0.20 \leq z/(1-y-z) \leq 0.90$.

21. A thermistor element as defined in claims 7 wherein the composition has been calcined at 1200°–1400° C.

22. A thermistor element as defined in claim 8 wherein the sintering aid is at least one selected from the group of silica, mullite, and materials of the types of $CaO-SiO_2$, $SrO-SiO_2$, $MgO-SiO_2$, $B_2O_3-SiO_2-Al_2O_3$ and $B_2O_3-SiO_2$.

23. A process for producing a thermistor element comprising:
 (a) providing a ceramic composition represented by the formula $(M^1_{1-x}.N^1_x)(P^2_{1-y-z}.N^2_y.Al_z)O_3$
 where $M^1$ is one or more elements selected from the group consisting of the elements belonging to the group 3A of the International Periodic Table excluding La, $N^1$ is one or more elements selected from the group consisting of the elements belonging to the group 2A of the International Periodic Table, $P^2$ is one or more elements selected from the group consisting of the elements of the groups 4A, 5A, 6A, 7A and 8 of the International Periodic Table whose oxides exhibit p-type characteristics, and $N^2$ is one or more elements selected from the group consisting of the elements of groups 4A, 5A, 6A, 7A and 8 of the International Periodic Table whose oxides exhibit n-type characteristics,
 wherein x, y and z are larger than 0 and smaller than 1 and satisfy the following formulas $0.001 \leq x/(1-y-z) < 0.20$ $0.05 \leq y/(1-y-z) \leq 0.80$ $0 < z/(1-y-z) \leq 0.90$, and (b) sintering, using said composition, to a sintered body, said sintered body having a negative temperature coefficient.

24. A process as defined in claim 23 wherein the composition further comprises a sintering aid.

25. A process as defined in claim 23 or 24 which further comprises a step of calcining a raw material mixture before sintering.

26. A process as defined in claim 25 wherein the calcination is carried out about at 1200°–1400° C.

27. A process as defined in claim 25 which further comprises, after the calcination, a step of pulverization before sintering.

28. A process as defined in of claim 25 wherein the sintering is carried out in a temperature range not exceeding 1600° C.

29. A process as defined in claim 25 wherein the sintering is carried out in a temperature range of 1450°–1600° C.

30. A process as defined in claim 25 wherein the raw material mixture comprises at least one of salts of said elements.

* * * * *